United States Patent
Fukushima et al.

(10) Patent No.: US 8,205,517 B2
(45) Date of Patent: Jun. 26, 2012

(54) MOTOR-DRIVEN ACTUATOR

(75) Inventors: Keisuke Fukushima, Hiroshima-ken (JP); Hideki Noma, Hiroshima-ken (JP)

(73) Assignee: U-Shin Ltd., Tokyo-To (JP)

( * ) Notice: Subject to any disclaimer, the term of this patent is extended or adjusted under 35 U.S.C. 154(b) by 177 days.

(21) Appl. No.: 12/260,909

(22) Filed: Oct. 29, 2008

(65) Prior Publication Data
US 2009/0107274 A1 Apr. 30, 2009

(30) Foreign Application Priority Data

Oct. 31, 2007 (JP) .................................. 2007-283978
Oct. 31, 2007 (JP) .................................. 2007-283979

(51) Int. Cl.
*B60R 25/02* (2006.01)

(52) U.S. Cl. ............. 74/409; 74/425; 74/606 R; 70/185; 180/187; 384/420

(58) Field of Classification Search .................. 74/409, 74/425, 426, 606 R; 70/184, 186, 185; 180/287; 384/420
See application file for complete search history.

(56) References Cited

U.S. PATENT DOCUMENTS

| 2,108,262 | A | * | 2/1938 | Jones ............................ 384/251 |
| 2,877,658 | A | * | 3/1959 | Anthony ......................... 74/409 |
| 3,690,194 | A | * | 9/1972 | Edwards ......................... 74/427 |
| 4,516,415 | A | * | 5/1985 | Kobayashi et al. ............. 70/252 |
| 7,065,993 | B2 | * | 6/2006 | Fukushima ..................... 70/252 |

FOREIGN PATENT DOCUMENTS

JP 2006-015984 1/2006

* cited by examiner

*Primary Examiner* — William C Joyce
(74) *Attorney, Agent, or Firm* — Hogan Lovells US LLP

(57) ABSTRACT

A motor-driven actuator is provided that can prevent generation of hitting sound due to rattling of an output shaft of a motor. The motor-driven actuator is equipped with a motor with an output shaft, worm attached to the output shaft, and rotation member with a worm wheel engaging with the worm inside a case, wherein a bearing member equipped with a regulating face adjacent to a top end of said output shaft and intergrading by biasing force of a spring in a manner said regulating face pushes the top end of said output shaft into the direction of thrust is provided.

3 Claims, 13 Drawing Sheets

MOTOR-DRIVEN ACTUATOR

BACKGROUND OF THE INVENTION

The present invention relates to a motor-driven actuator used for vehicles, and the like.

BACKGROUND ART

A motor-driven actuator is housed in a motor-driven steering lock device by which a steering shaft of a vehicle is locked or unlocked by driving force of a motor.

A motor-driven steering lock device of this type of the prior arts is shown in Japanese Laid-Open Patent Application Gazette No. 2006-015984.

This motor-driven steering lock device 100 is equipped with a case 103 comprising a case body 101 and a case cover 102 that covers a lower portion of the case body 101 as shown in FIGS. 10, 11 and 12.

In said case 103, a motor 104, a worm 106 that transmits rotation of an output shaft 105 of the motor 104, a worm wheel 107 that engages with this worm 106, a cam mechanism intergraded by rotation of the worm wheel 107, and a lock bolt 108 for locking that is moved linearly by this cam mechanism.

Said worm wheel 107 is in a nearly cylindrical shape and is held rotatably within the case 103 by cylindrical parts 101a and 102a provided in the case body 101 and case cover 102 respectively.

Inside the worm wheel 107, the lock bolt 108 is arranged to a direction of a rotating shaft in a manner to be able to go to and fro.

Further, the case cover 102 is equipped with an engaging groove 114 to which an engaging convex portion 113 engages slidably in order to prevent the lock bolt 108 from moving together with the worm wheel 107, said convex portion being provided on an outer circumference of the lock bolt 108.

Said cam mechanism comprises a cam groove 109 provided on a slant to the circumferential direction to an outer circumference of a cylindrical part 108a of the lock bolt 108, and a cam follower 111 held in a longitudinal groove 110 provided in an inner circumference of the worm wheel 107. Said cam mechanism is constituted wherein when the worm 106 and the worm wheel 107 are rotated by rotation of the motor 104, the lock bolt 108 moves to and fro a thrusting hole 112 of lock bolt of the case 103 by the movement of the cam follower 111 within the cam groove 109, and intergrades between a locked position engaging with the steering shaft (not shown) and an unlocked position not engaging with the steering shaft.

In the motor-driven steering lock device 100 disclosed in this Publication of patent application, thrust load is generated to the worm 106 by mating with the worm wheel 107, said worm being mounted on an output shaft of the motor.

For example, in FIG. 10, when the output shaft and worm 106 are rotated normally in a manner that the worm wheel 107 is rotated counterclockwise, thrust reactive force applied to the worm 106 from the worm wheel 107 acts to the direction of the thrust toward a side from which the output shaft 105 is projected from the motor.

On the other hand, when the output shaft 105 and worm 106 are rotated reversely in order for the worm wheel 107 to rotate clockwise, the thrust reactive force applied to the worm 106 from the worm wheel 107 acts the output shaft 105 to the direction of the trust toward the motor.

This reversal movement of the motor generates to the output shaft 105 of the motor the rattling to the direction of the thrust. It is one cause of a shorter life of the motor.

In this motor-driven steering lock device 100, ends 117 and 118 of the case 103, said case housing the motor, are constituted as adjacent to a front end and rear end of the output shaft 105, thereby the rattling of the output shaft 105 of the motor to the direction of the thrust is prevented. However, due to dispersion of dimensions of the case 103 when manufactured, it is required to provide some gap between the outputs axis 105 of the motor and the ends 117 and 118 of the case 103.

By this reason, when a gap becomes larger due to the dispersion of dimensions, the structure of the motor-driven steering lock device 100 in the Publication of patent application above can not prevent the raffling caused by the gap to the direction of the thrust.

Accordingly, there has been a problem that hitting sound (percussive noise) generated by hitting of the output shaft 105 to the case 103 cannot be prevented when the motor is driven.

Further, in the structure of the motor-driven steering lock device 100 as mentioned above, when the case body 101 and a case cover 102 is assembled to form the case 103, it is difficult to match the rotating shaft of respective cylindrical part 101a and 102a, said cylindrical parts holding the worm wheel 107 rotatably, due to error in case of assembling, etc. since the case body 101 and the case cover 102 are constituted separately.

To absorb this mismatch of the rotating shafts, some gap is provided between the cylindrical part 102a at the side of the case cover 102 and the worm wheel 107, while the worm wheel 107 that accommodates the lock bolt 108 inside is held rotatably by the cylindrical part 101a at the side of the case body 101 because the lock bolt 108 pierces into the lock bolt thrusting hole 112 of the case body 101.

In this case, the lock bolt 108 is positioned to the case body 101 as the result, because the lock bolt 108 is constituted to be held inside the worm wheel 107, said worm wheel being held in the case body 101.

Accordingly, likewise as mentioned above, as there might be displacement in case of assembling between an engagement convex 113 of the lock bolt 108, said convex being positioned in the case body 1, and an engagement groove 114 of the case cover 102 due to affect of error in case of assembling of the case body 101 and the case cover 102, it is required to provide some gap between the engagement convex 113 and the engagement groove 114.

However, if such a gap is provided, the lock bolt 108 rotates slightly when the worm wheel 107 rotates, and there occurs a problem of loud hitting sound harsh to a user, generated by hitting of the engagement convex 113 and the engagement groove 114.

In view of the problems mentioned above, the first object of the present invention is to provide a motor-driven actuator that prevents rattling of an output shaft of a motor and occurrence of hitting sound generated by the output shaft when the motor is driven.

Further, the second object of the present invention is to provide a motor-driven actuator that diminishes the generation of hitting sound due to error in case of assembling when the motor is driven.

SUMMARY OF THE INVENTION

In order to achieve the first object mentioned above, the motor-driven actuator according to the present invention provides inside a case a motor with an output shaft, a worm attached to said output shaft, and a rotation member equipped with a worm wheel that mates with said worm, wherein a bearing member equipped with a regulating face adjacent to a top end of said output shaft are provided, said bearing member being intergraded by biasing force of a spring that said regulating face pushes the top end of said output shaft into the direction of thrust of the output shaft.

According to this motor-driven actuator, a gap between the output shaft of the motor and the bearing member can be reduced by moving the bearing member by the biasing force of the spring.

By this, a gap of the output shaft of the motor can be reduced by the regulating face of the bearing member, and thereby rattling of the output shaft to the direction of thrust can be prevented surely.

As a result, generation of hitting sound by the output shaft when the motor is driven can be prevented.

This motor-driven actuator can be equipped with a motor cover, said cover holding said motor in a prescribed position in said case and having a fixed portion to prevent movement of said bearing member by assembling it to said case.

This structure can prevent displacement of the bearing member during operation because the movement of the bearing member is prevented by the fixed portion of the motor cover assembled to the case, and because the bearing member is fixed to the case body in the status adjacent to the top end of the output shaft.

This motor-driven actuator can be equipped with a housing in said case, said housing accommodating said bearing member movably, wherein operating direction of said bearing member biased by the biasing force of said spring in said housing can be set to cross with the direction of thrust of the output shaft of said motor.

If set as above, a part of loading applied to the bearing member is received by the side of the housing and the remaining load operates to the bearing member as to oppose the biasing force of the spring even if strong thrust load operates to the output shaft of the motor to the direction of trust since the bearing member is arranged movably in the housing to the crossing direction with the direction of thrust of the output shaft.

That is, displacement of the bearing member can be prevented since the load operating to the direction to move the bearing member as opposing the biasing force of the spring is reduced.

Further, load to a fixed part of the fixed portion and the bearing member is reduced and release of the fixed situation of the bearing member by the fixed portion can be prevented.

In the motor-driven actuator, said regulating face of the bearing member can be provided in a manner to face orthogonally with the direction of trust of said output shaft, and the operating direction of said bearing member can be inclined at a prescribed angle to the regulating face.

If constituted as above, a center of the output shaft can be received by the regulating face in the front and deflection of the center of the output shaft can be prevented when the motor is driven, whereby improper mating of the worm and worm wheel can be prevented.

Further, in order to achieve the second object mentioned above, the motor-driven actuator for steering locking for vehicles according to the present invention is provided with a lock bolt engaging with a steering shaft to prevent rotation of a steering; a rotation member holding said lock bolt inside to and fro to the direction of rotation; a cam mechanism having a cam groove and a cam follower and moving said lock bolt to the direction of the rotating shaft of said rotation member by moving said cam follower in said cam groove by the rotation of said rotation member, said cam groove disposed a one side of said lock bolt and said rotation member and inclined to the circumferential direction, and said cam follower disposed at the other side and sliding in said cam groove; a case body equipped with a lock bolt thrusting hole to trust said lock bolt externally; and a case cover closing an opening of said case body; wherein a rotation holding portion to hold rotatably said rotation member, and a rotation prevention portion engaging with an engagement portion of said lock bolt to prevent rotation of said lock bolt are disposed on the side of said case body.

According to the motor-driven steering lock device, both of the rotation member and the lock bolt are positioned to the case body by equipping the rotation holding portion by which the rotation member holding the lock bolt to and fro is held rotatably at the side of the case body in which the lock bolt thrusting hole is equipped.

If the rotation preventing portion is equipped at the side of the case body, said portion preventing rotation of the lock bolt, displacement of the lock bolt to the rotation preventing portion can be lesser.

By this, a gap between an engagement portion of the lock bolt and the rotation preventing portion can be set smaller.

As a result, hitting sound can be lower in case of hitting by rotation of the lock bolt, and thereby comfort of a user can be enhanced.

It is favorable in the motor-driven steering lock device that said engagement portion is equipped projecting in the advancing direction of said lock bolt.

By this, width of the lock bolt can be smaller and interference of the engagement portion with the rotation member can be prevented when assembled with the rotation member, by which easy assembling can be enhanced.

As stated above, according to the motor-driven actuator of the present invention, rattling to the direction of thrust of the output shaft of the motor can be surely prevented and hitting sound by the output shaft can be prevented as a result when the motor is driven.

Further, according to the motor-driven actuator of the present invention, displacement of the lock bolt to the rotation preventing portion can be lesser by equipping the rotation preventing portion at the side of the case body in which the rotation member and the lock bolt are positioned, said portion preventing the rotation of the lock bolt.

By this, a gap between an engagement portion of the lock bolt and the rotation preventing portion can be set smaller.

As a result, hitting sound can be lesser in case of hitting by rotation of the lock bolt, and thereby comfort of a user can be enhanced.

DESCRIPTION OF THE PREFERRED EMBODIMENT

Figure 1:
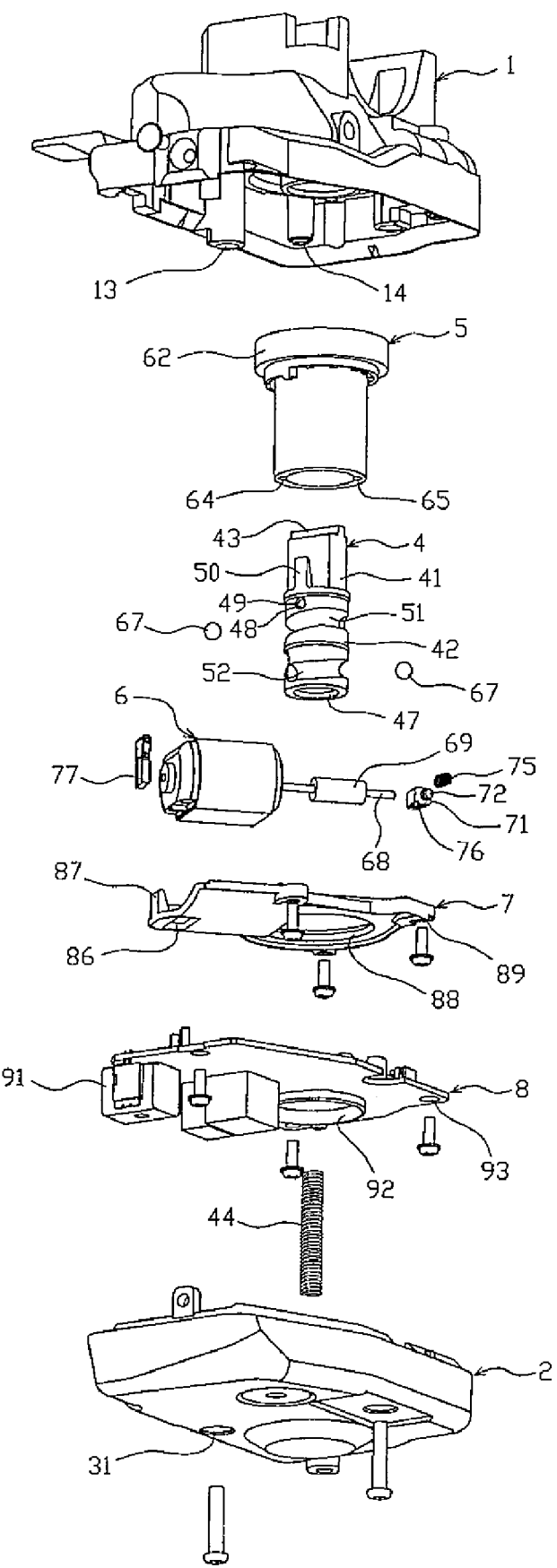
FIG. 1 is an exploded perspective view showing a motor-driven steering lock device employing a motor-driven actuator according to an embodiment of the present invention.

Now, embodiment of the present invention is described referring to the drawings.

Figure 2:
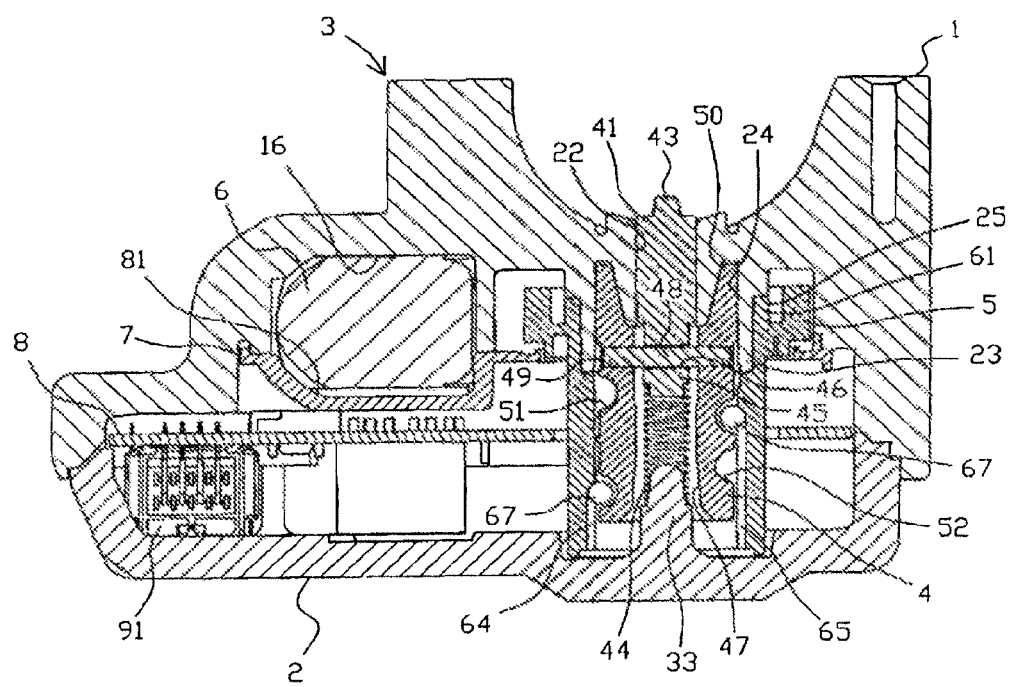
FIG. 2 is a cross sectional view showing a locked status of the motor-driven steering lock device in FIG. 1.

FIGS. 1 and 2 show a motor-driven steering lock device (hereinafter referred to as "lock device") for which a motor-driven actuator according to the embodiment of the present invention is employed.

This lock device is disposed around a steering shaft rotating by rotating operation of a steering (not shown), and operated in communication with operation of a push switch or card key to start or stop an engine, etc.

An engagement recess is formed on the steering shaft at a prescribed position to the circumferential direction as in the prior art.

The lock device according to this embodiment is equipped with a case 3 comprising a case body 1 with one end opened and a case cover 2, and inside them, a lock bolt 4, a rotation member 5, a cam mechanism to convert rotating movement of said rotation member 5 to to-and-fro movement of the lock bolt 4, a motor 6 that is an actuator, a motor cover 7, and a control panel 8 to control the operation of said motor 6.

Figure 3:
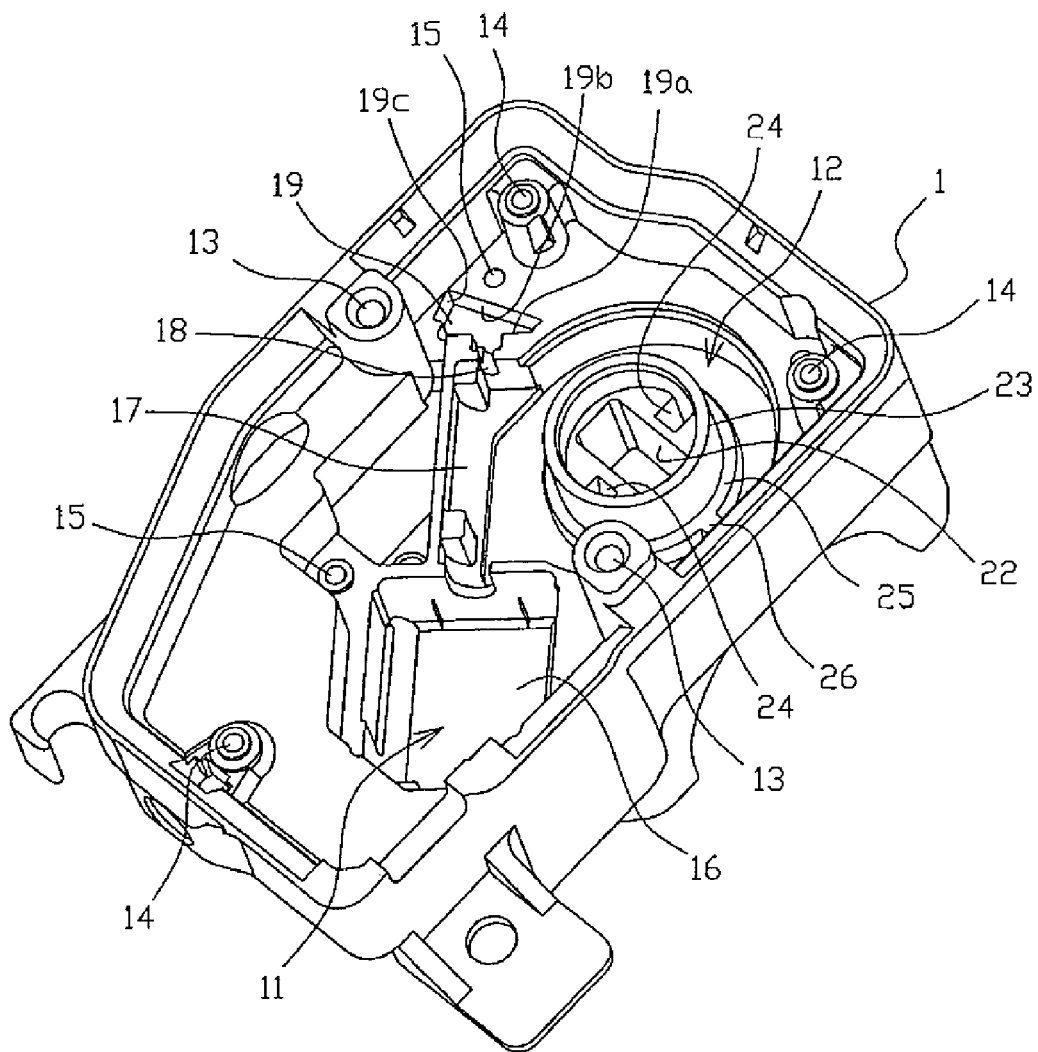
FIG. 3 is a perspective view seen from an opening side of a case body.

Said case body 1, as shown in FIG. 3, is comprised of a container in a rectangular shape with one end opened, wherein a motor disposing portion 11 to dispose the motor 6, a lock mechanism disposing portion 12 to dispose the lock bolt 4 and the rotation member 5, a screw hole 13 to screw and fix the case cover 2, a boss for panel 14 to screw and fix the control panel 8, and a screw hole 15 for motor cover to screw and fix the motor cover 7 are formed.

Figure 5:
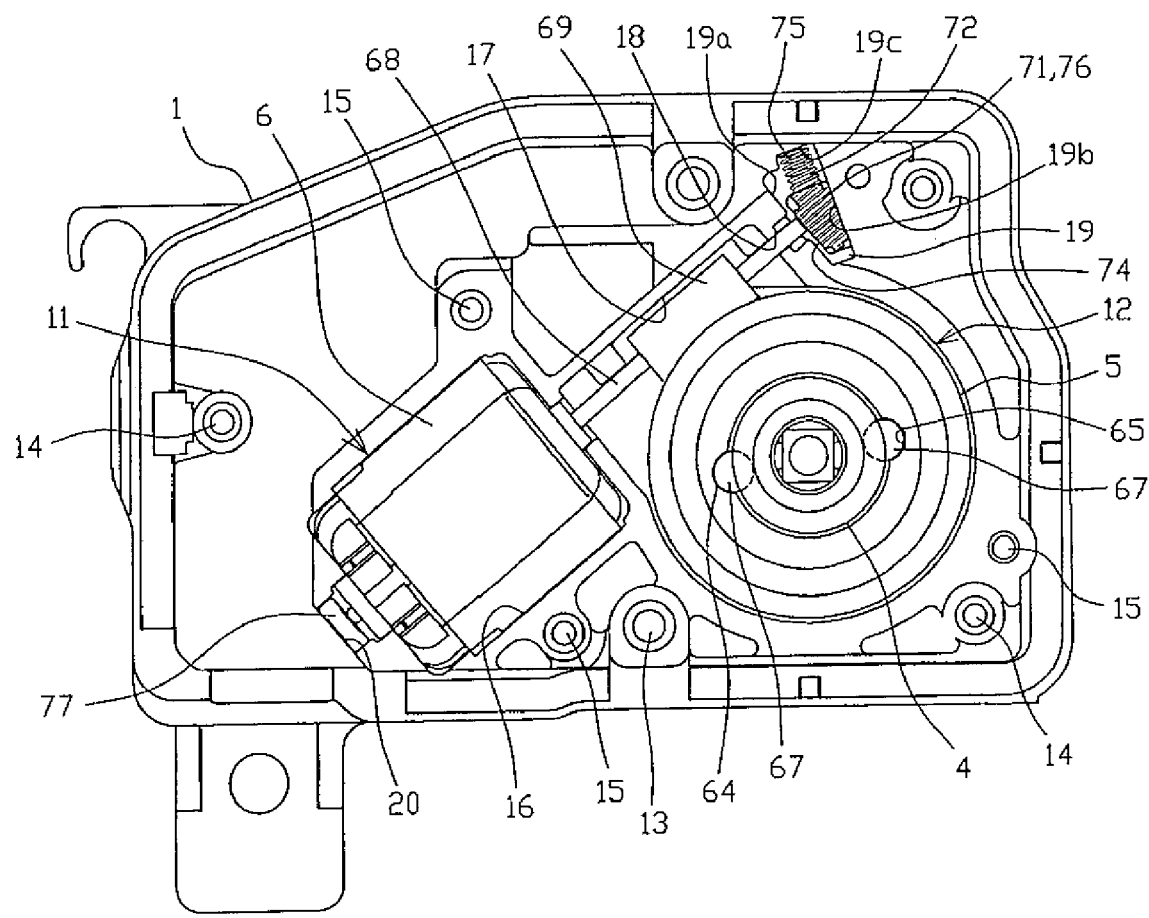
FIG. 5 is a bottom view seen from lower portion of FIG. 2 in which the case cover and a motor cover are removed.

Said motor disposing portion 11 is for disposing the motor 6, and as shown in FIGS. 3 and 5, a motor housing recess 16 along a contour of the motor 6, a worm housing recess 17 housing a worm 69 attached to an output shaft 68 of the motor 6 in communication with the motor housing recess 16, and a shaft holding portion 18 in an approximate U shape of the cross section, said portion rotatably holding a top end of the output shaft 68 of the motor 6 are formed linearly.

A first housing portion 19 (housing portion) is provided at a front end of the shaft holding portion 18 (at a side opposing to the motor housing recess 16) in communication with said shaft holding portion 18, said housing portion housing a first bearing member 71 movably as described hereinbelow.

The first housing portion 19 is disposed in recess in a nearly triangle shape, and has a first side 19a, a second side 11b and a third side 19c, said first side 19a being facing the end side of the shaft holding portion 18 and equipped in a longitudinal direction of the worm housing recess 17, that is, orthogonally with the direction of thrust of the output shaft 68 of the motor 6 when the motor 6 is attached, and the second side 19b being equipped at a slant at a prescribed angle to the first side 19a opposing said first side 19a, and the third side 19c being equipped nearly orthogonally to said second side 19b.

On the other hand, a second housing portion 20 (illustrated in FIG. 5) is provided at the rear end of the motor housing recess 16, said portion being formed with the motor disposing portion 11 extended with a prescribed length at a position corresponding to the rear end of the output shaft 68 of the motor 6.

Said lock mechanism disposing portion 12 is for disposing the lock bolt 4 and the rotation member 5, and equipped with a lock bolt thrusting hole 22 thrusting along the direction of attachment of the case cover 2.

Further, a rotation holding portion 23 is equipped around said lock bolt thrusting hole 22, said portion being projecting inwards to form a ring shape around a center of said lock bolt thrusting hole 22 to support the rotation member 5 rotatably.

Two rotation preventing holes 24 (rotation preventing portion and lock bolt holding portion) are provided at opposing positions sandwiching said lock bolt thrusting hole 22 in the rotation holding portion 23, said holes 24 holding an engagement portion 50 of the lock bolt 4 (described below) in a manner moving to-and-fro.

These rotation preventing holes 24 are with nearly square cross section and bored in parallel with the trusting direction of the lock bolt thrusting hole 22, said holes 24 being inclining to the opposing face as a face at the side to the diameter moves to the rear, and being set so as the cross sectional shape of an opening to be largest.

Further, a step 25 on which an upper face of the rotation member 5 abuts at a circumference of the rotation holding portion 23 is equipped and a regulating convex 26 is equipped at a prescribed position of the circumference of the step 25, said convex 26 regulating a scope of rotation of rotatable members and projecting to the direction of the diameter.

Figure 4:
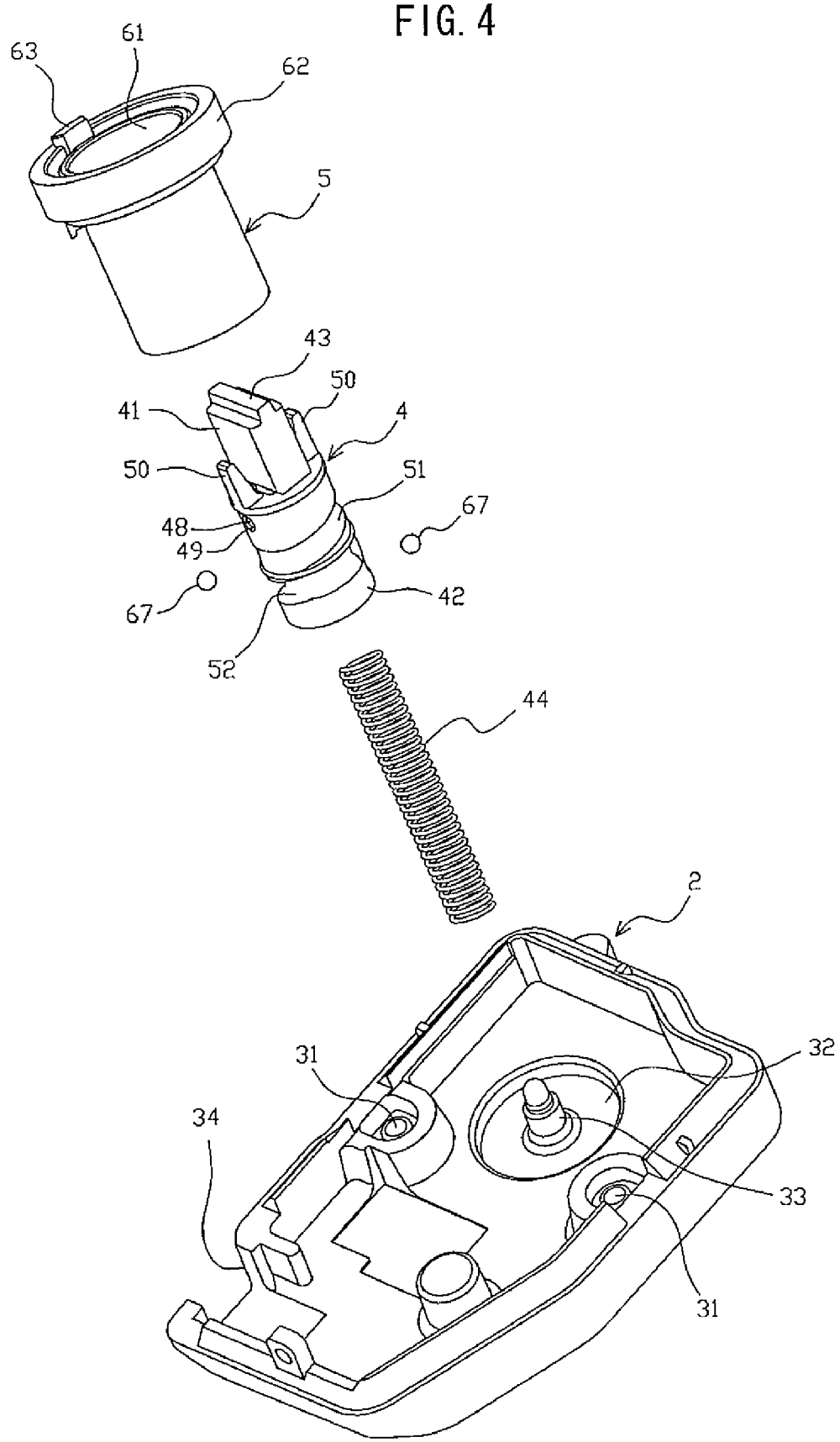
FIG. 4 is an exploded perspective view of a cam mechanism and a case cover.

Said case cover 2 is for closing an opening of the case body 1 and is equipped with a screw thrusting hole 31 at a position corresponding to the screw hole 13 of the case body 1 as shown in FIG. 4.

This case cover 2 is equipped with a cylindrical recess 3 at a position corresponding to the rotation holding portion 23 of the lock mechanism disposing portion 12, said recess holding a lower face of the rotation member 5.

A spring attachment shaft 33 is equipped in projection at the center of the bottom of the cylindrical recess 32, said shaft 33 attaching and mating with outwards a spring 44 for lock bolt biasing the lock bolt 4 to the advancing direction.

Further, the case cover 2 is equipped with a notch 34 at a side wall orthogonal with a side wall positioned at an opposite side to the cylindrical recess 32, said notch 34 being for exposing a connector 91 for electric connection.

Said lock bolt 4 is disposed inside the rotation member 5 in a manner moving to-and-fro to the direction of the rotating shaft of the rotation member 5 and comprised of a lock member 41 in a shape of a square pole and a cam member 42, said lock member being able to thrust into the lock bolt thrusting hole 22 and said cam member moving said lock member to-and-fro as shown in FIGS. 1, 2 and 4.

An engagement convex 43 is equipped at an upper end of the lock member 41, said convex being thrust into and engaged with the engagement recess of the steering shaft.

This lock member 41 is moved to-and-fro by the motor 6 via the rotation member 5 and the cam mechanism between a locked position and unlocked position, said locked position being advanced to the side of the steering shaft and engaging with the engagement recess, and the unlocked position going back and releasing the engagement.

Further, if the engagement convex 43 is not coincident in the circumferential direction to the engagement recess, it is biased by the spring 44 for lock bolt to the advancing direction, and if coincident, it is advanced and engaged by the biasing force.

As shown in FIG. 2, an attachment convex 45 is projected and disposed at the lower position of the lock member 41 in order to be connected with the cam member 42.

This attachment convex 45 is with a rectangular cross section, and a connecting hole 46 is equipped orthogonally with the axial direction.

Said cam member 42 is in a nearly cylindrical shape disposed inside the rotation member 5 as hereinafter described.

A thrusting hole 47 is equipped in the cam member 42, said hole thrusting from an upper end to lower end along the axial center of the lock member 41.

This thrusting hole 47 is in a rectangular shape, the upper of which is coincident with the attachment convex 45, and the cam member 42 is equipped with a connecting hole 49 at a position corresponding to the connecting hole 46, said hole 49 thrusting a connecting pin 48.

Further, a lower portion of the thrusting hole 47 is in a conic shape in which an end of the spring 44 for lock member as a biasing member is inserted.

An end of the spring 44 for lock bolt is positioned by an end of the lock member 41 attached to an upper portion of the thrusting hole 47.

Further, two engagement portions 50 are projected and disposed at an upper face of the cam member 42 at an opposing position sandwiching the thrusting hole 47, said portions advancing to-and-fro to the rotation preventing hole 24 of the case body 1, engaging to the circumferential direction and preventing rotation of the cam member 42 to the case body 1.

These engagement portions 50 are in a shape substantially similar with the shape of the rotation preventing hole 24 of the case body 11 and equipped slightly smaller than the rotation preventing hole 24.

More specifically, these engagement portions 50 are projected and equipped in parallel with the advancing direction of the lock member 41 along a face substantially coincident with the outer circumference of the cam member 42, and formed with a tapered shape inclining to the opposing face as the face inside the radial direction advances to the projecting direction.

Further, these engagement portions 50 are formed longer than the moving distance from the locked position to the unlocked position of the lock bolt 4. Even if the lock bolt 4 moves to the unlocked position, an engageable status of the rotation preventing hole 24 and the engagement portions 50 are maintained. The cam member 42 is preventing from inclining to an operating axis of the lock bolt 4 since the engagement portions 50 are held by the outer side of the rotation preventing hole 24 to the radial direction.

A pair of cam grooves 51, 52 are equipped on the circumference of the cam member 42, opposing to the radial direction, said grooves being recessed in a nearly hemicycle shape and rotating in a spiral shape. The first cam groove 51 on one side is equipped displacing to the advancing direction of the lock bolt 4 against the second cam groove 52 on the other side, more than the height of the second cam groove 52, and displaced 180° to the circumferential direction. These cam grooves 51, 52 convert the rotating force of the rotation member 5 to linear movement of the lock bolt 4 via said cam member 42.

Figure 8:
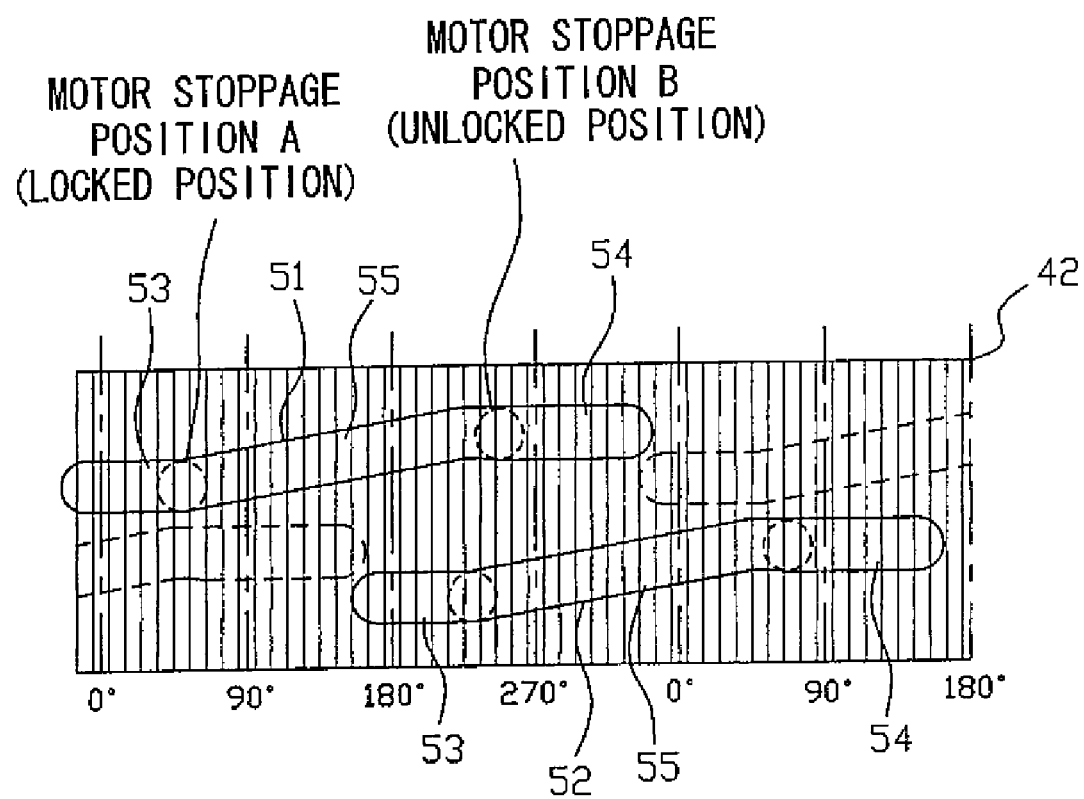
FIG. 8 is a development elevation of an outer circumference of a cam member of a lock bolt.

FIG. 8 shows a development elevation of the outer circumference of the cam member 42, and vertical lines with equal interval in the drawing show angular lines every 10 degree. Upper and lower directions in the drawing show the height direction, and the upper side is equivalent to a top end of the lock bolt 4 (that is, steering shaft side) and the lower side to a rear side of the lock bolt 4.

A prescribed area of one end (lower) of these cam grooves 51, 52 is set in advance at a locked area 53 (starting point) of the steering shaft by the lock bolt 4, and a prescribed area of other end (upper) as an unlocked area 54 (terminating point) of the steering shaft by the lock bolt 4.

And, inclining angle of the inclining portion 55 between these locked area 53 and unlocked area 54 sets the speed of moving to-and-fro of the lock bolt 4.

In this embodiment, interference of the first cam groove 51 and the second cam groove 52 can be prevented since the first cam groove 51 is disposed displacing to the to-and-fro direction of the lock bolt 4 more than the height of the upper and lower direction from the locked area 53 to the unlocked area 54 of the second cam groove 52, and inclining angle and length of an inclining portion 55 of each of the cam grooves 51, 52 can be set freely.

By this reason, it is not necessary to change the inclining angle of the inclining portion 55 along the way due to shortage of a space, and the angle can be set at certain angle.

As mentioned above, if the inclining angle of the inclining portion 55 is set constant, generation of hitting sound of a cam follower 67 with a step can be eliminated since the cam follower 67 does not hit the step in process of inclining.

Said rotation member 5 is in a cylindrical shape with an inner diameter slightly larger than the cam member 42, and supported rotatably to the circumferential direction in a manner to be sandwiched between the case body 1 and the case cover 2 without being moved to the radial direction.

More concretely, as shown in FIGS. 2 and 4, the rotation member 5 is equipped with outer coupling portion 61 on one end (upper), said portion coupling with the outer circumferential portion of the rotation holding portion 23 of the case body 1.

Further, a worm wheel portion 62 is equipped on the upper portion of the rotation member 5, said portion projecting in the cross sectional shape of L from the outer circumference of the outer coupling portion 61 to the diametrical direction and forming a plurality of helical gears (not shown) extending along the radial direction outer-circumferentially.

This worm wheel portion 62 rotates the rotation member 5 around the center of the axis line by engaging with dents of a worm 69 disposed to extend to the direction of the tangent line at the attaching condition to the case body 1 as shown in FIG. 5.

Further, a regulating receptor 63 (shown in FIG. 4) is projected and equipped on the upper face of the worm wheel portion 62, said receptor engaging with the regulating convex 26 of the case body 1 and regulating the scope of rotation of the rotation member 5.

Furthermore, a pair of longitudinal grooves 64, 65 is equipped on the inner circumference of the rotation member 5, said grooves extending along the radial direction from the lower end, and being recessed in nearly semicircle shape.

The longitudinal groove 64 of one side is equipped extending to the position corresponding to the second cam groove 52, and the longitudinal groove 65 of other side is equipped extending to the position corresponding to the first cam groove 51, upper longer than the longitudinal groove 64 of one side.

Said cam follower 67 is comprised of a steel ball in the spherical shape, and is disposed to each longitudinal grooves 64, 65 of the rotation member 5 respectively as shown in FIG. 2.

When the rotation member 5 is rotated in the condition that projecting portions form the longitudinal grooves 64, 65 are coupled with each cam groove 51, 52 of the cam member 42, it slides along each cam groove 51, 52 of the cam member 42 regulated not to rotate by rotation of the longitudinal grooves 64, 65 to the circumferential direction.

Accordingly, the lock bolt 4 is moved to-and-fro along the center of the rotating shaft of the rotation member 5 via said cam member 42.

As described above, this embodiment is constituted wherein rotating force of the rotation member 5 is transmitted to the lock bolt 4, the cam groove 51, 52 are equipped on the lock bolt 4, and the cam follower 67 is disposed between the rotating member 5 and cam member 42, operating as a cam mechanism to move said lock bolt 4 between the locked position and unlocked position.

Said motor 6 is a power source to move the lock bolt 4 and is disposed at the motor housing recess 16 of the case body 1 via the motor cover 7.

This motor 6 can conduct normal rotation to advance the lock bolt 4 and reverse rotation to set back the lock bolt 4. As shown in FIG. 5, the output shaft 68 is equipped with the worm 69, said worm being a screw gear with spiral dents (not shown) along the radial direction outer-circumferentially.

The top end and rear end of the output shaft 68 abut on a first bearing member 71 and second bearing member 77 described hereinbelow, and regulate rattling to the direction of thrust of the output shaft 68.

The first bearing member 71 is housed in the first housing portion 19 of the case body 1, and abuts on the top end of the output shaft 68 of the motor 6, and prevents rattling generated to the direction of thrust of the output shaft 68, said member being formed with resin material such as polyacetal.

As shown in FIGS. 1 and 5, the first bearing member 71 is a bloc with the cross section of a wedge, and a spring positioning portion 72 is projected and equipped on a broader end section, said portion positioning a spring 75 and the interval between both sides becomes narrower as it goes to the other end.

Opposing angle of both sides is set similar with the opposing angle of the first side 19a and the second side 19b of the first housing portion 19, and a face corresponding to the first side 19a is a regulating face 74 abutting on the top end of the output shaft 68 of the motor 6 (see FIG. 5).

That is, when the first bearing member 71 is disposed along the first side 19a of the first housing portion 19, it is constituted so that the regulating face 74 faces at all times orthogonally with the direction of thrust of the output shaft 68 of the motor 6.

Further, the first bearing member 71 is inclining to the side of the motor 6 as the second side 19b of the first housing portion 19 goes to the advancing direction, and biased by biasing force of the spring 75 along the direction of the face of the second side 19b.

Accordingly, the first bearing member 71 intergrades to push the output shaft 68 of the motor 6 toward the direction of thrust by biasing force of the spring 75.

Furthermore, the upper face of the first bearing member 71 is equipped with a deformed portion 76 deformable, on which a mountain of the output shaft 68 of the motor 6 extending to the direction of thrust is arranged in plural orthogonally with the direction of thrust.

The second bearing member 77 is housed in the second housing portion 20 of the case body 1 and abuts on the rear end of the output shaft 68 of the motor 6, and prevents rattling generated to the direction of thrust of the output shaft 68, said member being formed with resin material such as polyacetal.

This second bearing member 77 is in a shape of substantial cuboid and inserted and fixed in the second housing portion 20.

Figure 6:
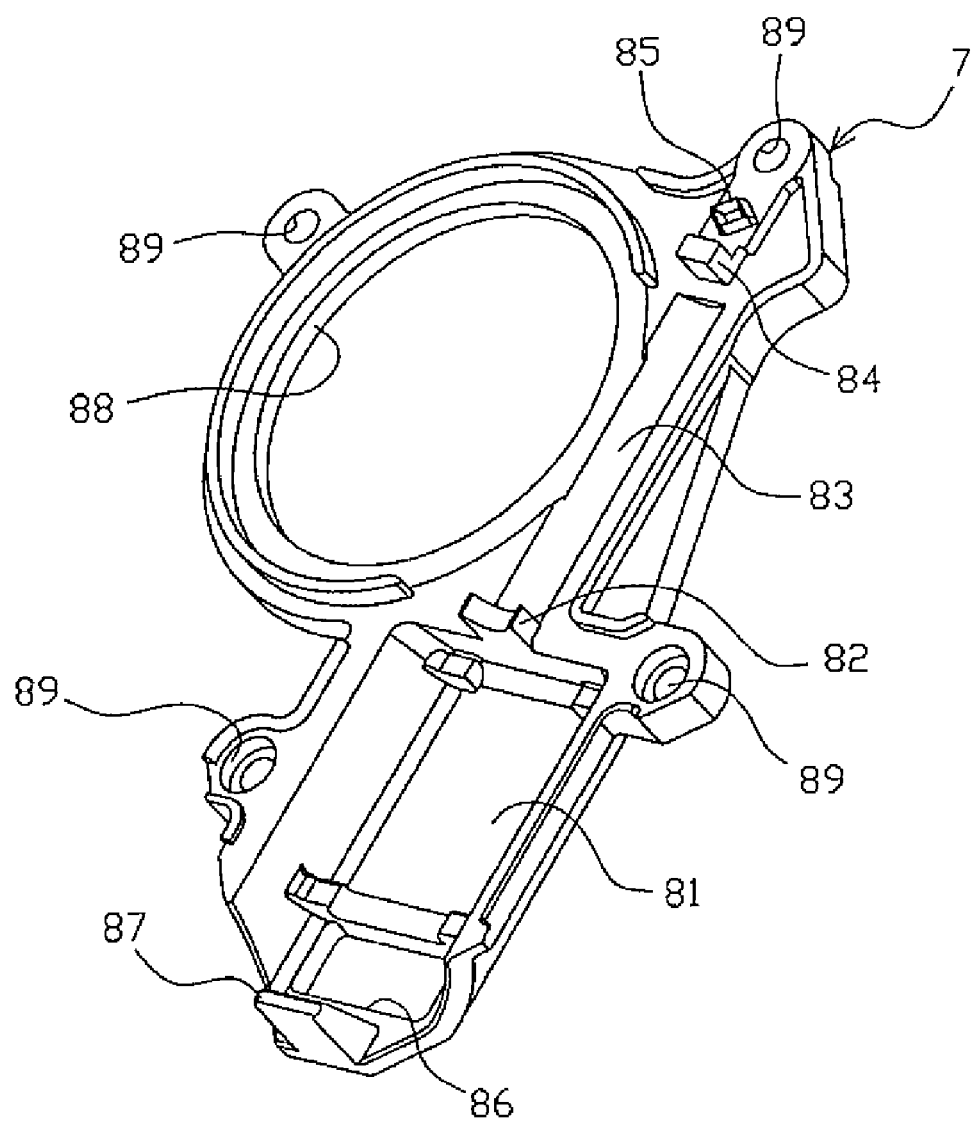
FIG. 6 is a perspective view of the motor cover.

The motor cover 7 is to accommodate the motor 6 undetachably in the motor disposing portion 11 of the case body 1 wherein, as shown in FIG. 6, a motor housing recess 81 along the contour of the motor 6, motor holding portion 82 abutting on a part of the motor 6, a worm housing recess 83 to accommodate the worm 69, and an shaft holding portion 84 to prevent the output shaft 68 of the motor 6 from slipping out from the shaft holding portion 18 are formed in linear arrangement from the rear end to the top end.

A fixing portion 85 is equipped on a front of the shaft holding portion 84, said fixing portion projecting a contour line with a lozenged cross section.

This fixing portion 85 is pushed to the deformed portion 76 of the first bearing member 71 when the motor cover 7 is assembled to the case body 1.

By this, the deformed portion 76 of the first bearing member 71 is deformed and the fixing portion 85 is broken into the deformed portion 76, and the first bearing member 71 is fixed at its position, whereby displacement of the first bearing member 71 prevented.

Further, an electrode thrusting hole 86 is equipped in the motor housing recess 81, said hole thrusting the a motor electrode (not shown) extending from the control panel 8 and connected to plus and minus terminals of the motor 6.

Furthermore, a second bearing member holding portion 87 is projected and equipped on the rear side of the motor housing recess 81, said portion abutting on the second bearing member 77 and prevent falling out of the second bearing member 77.

Furthermore, a thrusting hole 88 is equipped on the side of the worm housing recess 83, said hole thrusting and disposing the lock bolt 4 and rotation member 5.

Screw holes 89 are formed at the position corresponding to the screw holes 15 for motor cover of case body 1 respectively.

Said control panel 8 is implemented with a micro computer (CPU) (not shown) controlling the movement of the motor 6, a micro switch (not shown) to detect the advancing position of the lock bolt 4 by the rotation bolt 5, a connector 91 to connect to a main micro computer (ECU) mounted on a vehicle, and a motor electrode (not shown) to be connected to an external battery by the connector 91.

Further, this control panel 8 is equipped with a thrusting hole 92, said hole thrusting and disposing said lock bolt 4 and rotation member 5, and at the position corresponding to the boss 14 for panel of the case body 1 a screw hole 93 is formed to cramp screws when assembled to the case body 1.

Detailed description on a method to detect an advancing position of the lock bolt 4 by the micro switch is omitted since it has no direct relation with the present invention.

When the lock device with structure mentioned above is assembled, the lock bolt 4 and cam follower 67 are assembled to the rotation member 5 at first, said lock bolt connecting integrally the lock member 41 and cam member 42.

At this time, the lock bolt 4 is assembled thrusting from the lower opening to the upper opening of the rotation member 5. The engagement portion 50 of the lock bolt 4 does not interfere with the rotation member 50 when assembled because the engagement portion 50 of the lock bolt is projected and equipped to the projecting side of the lock member 41.

By this, easiness of assembling is enhanced and it is not required to form grooves, etc. on the rotation member 5 to prevent the interference with the engagement portion 50.

Next, they are disposed on the lock mechanism disposing portion 12 of the case body 1 (see FIG. 5).

After the motor 6 is disposed to the case body 1, the second bearing member 77, the first bearing member 71 and the spring 75 are successively assembled, and then the motor cover 7 is disposed and fixed to the case body 1 by screw cramping.

Thereafter, the control panel 8 is disposed at the opening of the case body 1 and fixed to the case body 1 by screw cramping.

Lastly, the case cover 2 is attached and fixed to the case body 1 by screw cramping.

In the lock device thus assembled, the top end of the output shaft 68 of the motor 6 is held abutting on the first bearing member 71, and the rear end of said output shaft 68 is held abutting on the second bearing member 77.

Further, since the first bearing member 71 is intergraded to push the output shaft 68 to the direction of thrust by biasing force of the spring 75 when assembled, a gap between the first bearing member 71 and the top end of the output shaft 68 can be determined appropriately.

Figure 7:
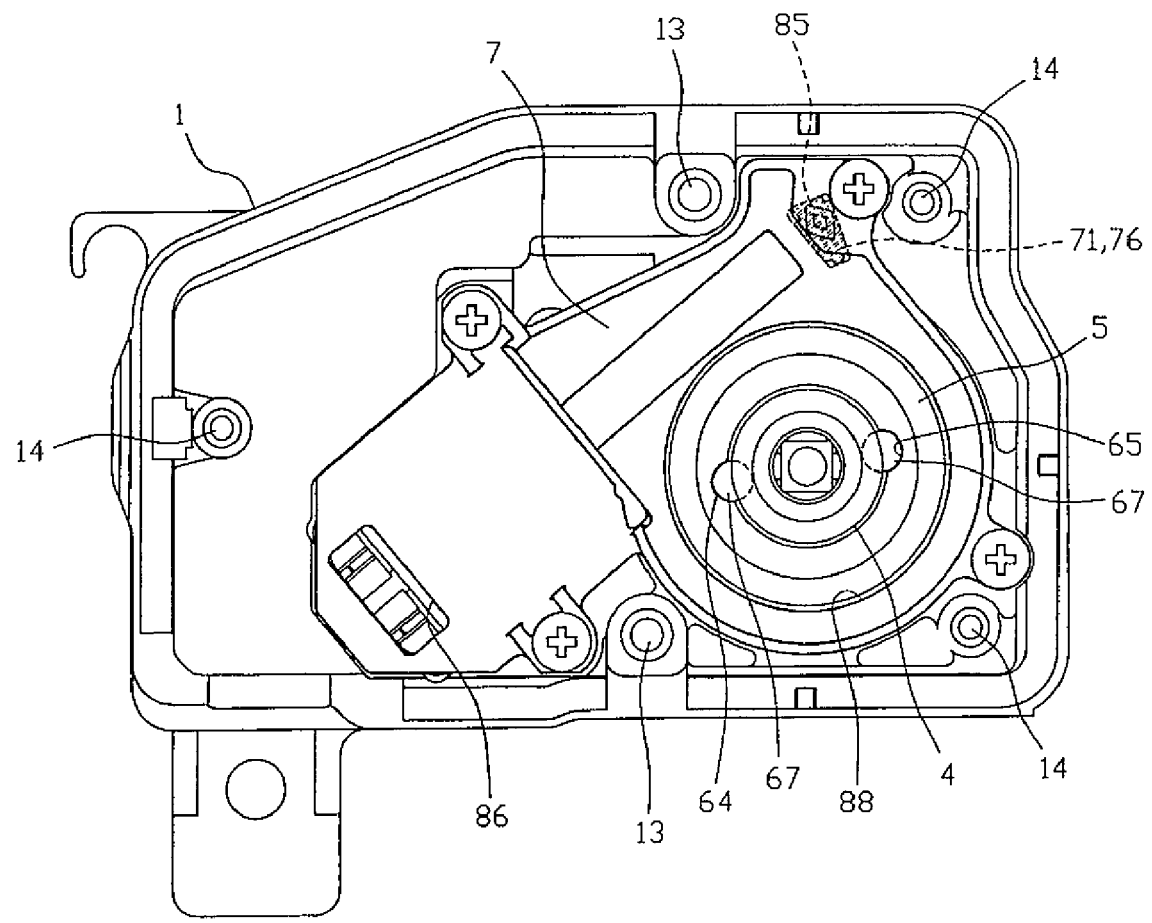
FIG. 7 is a bottom view showing a status of attaching the motor cover in FIG. 5.

Thereafter, as shown in FIG. 7, since the first bearing member 71 is fixed to the case body 1 in the condition that the fixed portion 85 of the motor cover 7 deforms and couples with the deformed portion 76 of the first bearing member 71 and abuts on the top end of the output shaft 68 by assembling of motor cover 7, displacement of the first bearing member 71 is prevented during the operation.

As a result, rattling to the direction of thrust of the output shaft 68 can be surely prevented.

Further, as the first bearing member 71 is disposed movably to the first housing portion 19 to the crossing direction with the direction of thrust of the output shaft 68, part of load applying to the first bearing member 71 is received by the second side 19b of the first housing portion 19, and the remaining load acts the first bearing member 71 to oppose the biasing force of the spring 75 even if strong load acts the output shaft 68 of the motor 6 to the direction of thrust.

That is, load acting to the direction moving the first bearing member 71 against the biasing force of the spring 75 can be diminished.

By this, load to a mating portion of the fixed portion 85 and the deformed portion 76 is diminished and further deformation of the deformed portion 76 is prevented. By this, it is possible to maintain the mating condition of the fixed portion 85 and the deformed portion 76, and to maintain the fixed condition of the first bearing member 71.

Furthermore, as the top end of the output shaft 68 of the motor 6 is received by the regulating face 74 orthogonally to the direction of trust, the center of the axis of the output shaft 68 can be received at the front and displacement of the center of the axis of the output shaft 68 can be prevented when the motor is activated.

Thereby, improper mating of the worm 69 with the worm wheel 62 can be prevented.

Figure 5A:
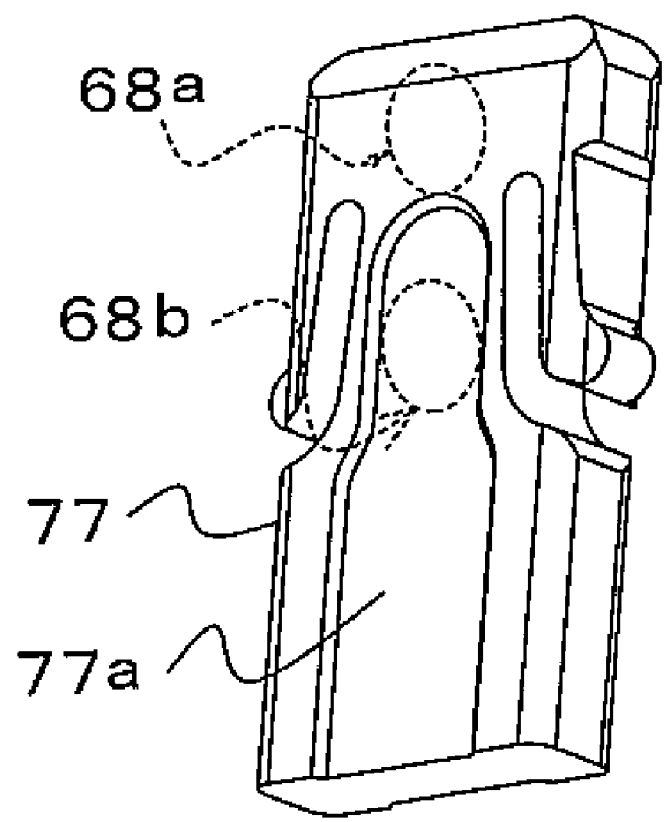
FIG. 5a is a perspective view of a second bearing member equipped in the motor-driven steering lock device mentioned above.

The lock device according to this embodiment is assembled as mentioned above. When the second bearing member 77 is constituted as shown in FIG. 5a, an appropriate gap can be disposed between the first and second bearing members 71, 77 and the output shaft 68 of the motor 6.

That is, after the motor 6 is disposed to the case body 1, the second bearing member 77, first bearing member 71 and spring 75 are assembled successively. At this time, the second bearing member 77 is put in an interim housing condition that its top end is inserted in the second housing portion 20, and the rear end of the output shaft 68 is abutted on a position of a dotted line 68a as shown in FIG. 5a.

The front end of the output shaft 68 is abutted on the first bearing member 71.

When the motor cover 7 is disposed, the second bearing member 77 is pushed by the second bearing holding portion 87 and the second bearing member 77 is surely housed in the second housing portion 20.

If assembled as above, movement of the first bearing member 71 is fixed by the fixed portion 85, and at the same time the rear end of the output shaft 68 of the motor 6 can abut on the bottom of a recess 77a of the second bearing member 77 as a position 68b shown in FIG. 5a.

By this, an appropriate gap as a bearing can be disposed between the first and second bearing members 71, 77 and the output shaft 68 corresponding to the recess 77a of the second bearing member 77. For example, an interval of 0.2 mm between the first bearing member 71 and the output shaft 68 can be set.

Next, operation of the lock device with the structure mentioned above is described.

When the lock device is in a locked condition as shown in FIG. 2, the worm 69 attached to the output shaft 68 rotates clockwise as seen from the side of the motor 6, by normal rotation of the motor 6, and the rotation member 5 in which the worm wheel portion 62 engages with the worm 69 starts to rotate to the unlocked direction (in FIG. 5, clockwise direction).

At this time, reactive thrust force applied from the worm wheel portion 62 to the worm 69 acts to the direction of thrust pointing the output shaft 68 of the motor 6 to the second bearing member 77. As the rear end of the output shaft 68 of the motor 6 abuts on the second bearing member 77 without any gap, the output shaft 68 does not rattle.

When the rotation member 5 starts to rotate in this way, the cam follower 67 residing in the locked area 53 in FIG. 8 moves sliding or rotating in the cam grooves 51, 52. However, the cam follower 67 is placed at the end of the longitudinal grooves 64, 65 and cannot move upwards. As the lock bolt 4 is in a not rotatable condition that the engagement portion 50 engages with the rotation prevention hole 24, the lock bolt 4 starts to move downwards by rotation of the rotation member 5.

When the cam follower 67 moves along the inclining portion 55 of the cam grooves 51, 52, the lock bolt 4 goes back from the locked position.

When the rotation member 5 rotates at about 250 degree, it is detected by the micro switch (not shown) that the rotation member 5 rotates to the unlocked position. The normal rotation of the motor 6 is stopped upon receipt of the switch signal while the cam follower 67 moves a little bit in the unlocked area 54 from the motor stopping position B of the cam grooves 51, 52 and then stops by inertia rotation of the motor 6 and the rotation member 5.

Figure 9:
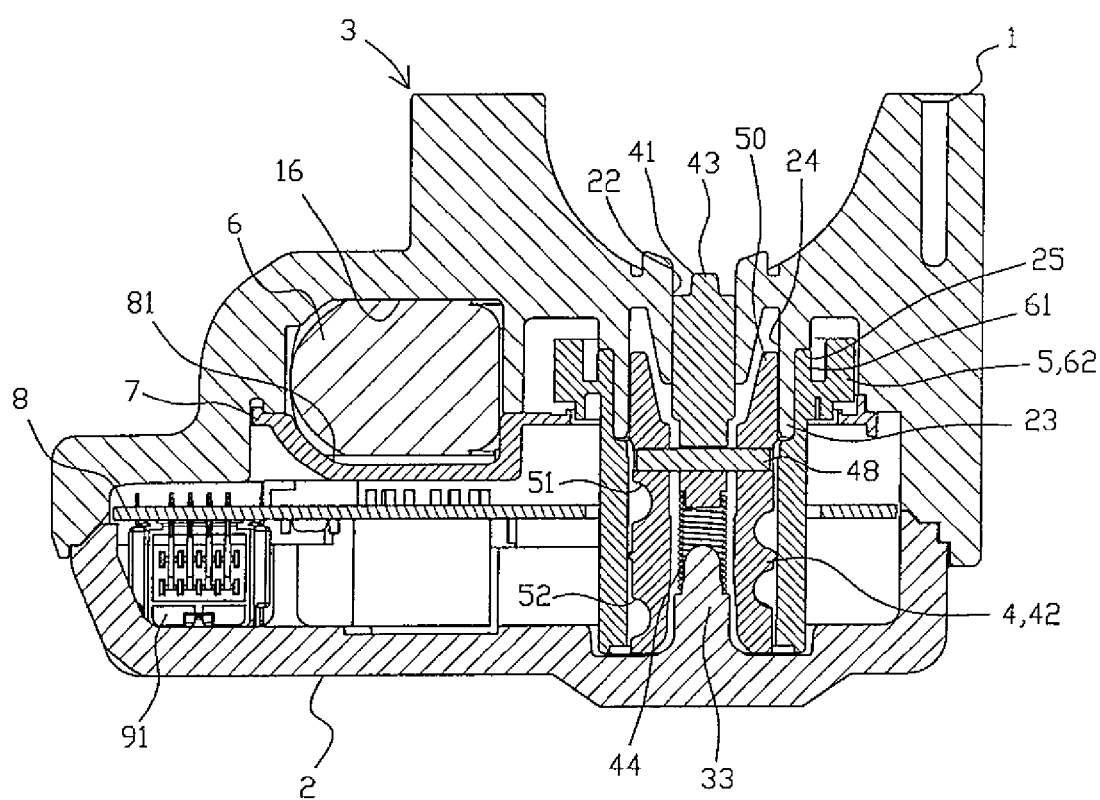
FIG. 9 is a cross sectional view of an unlocked status of the motor-driven steering lock device in FIG. 1.
Figure 10:
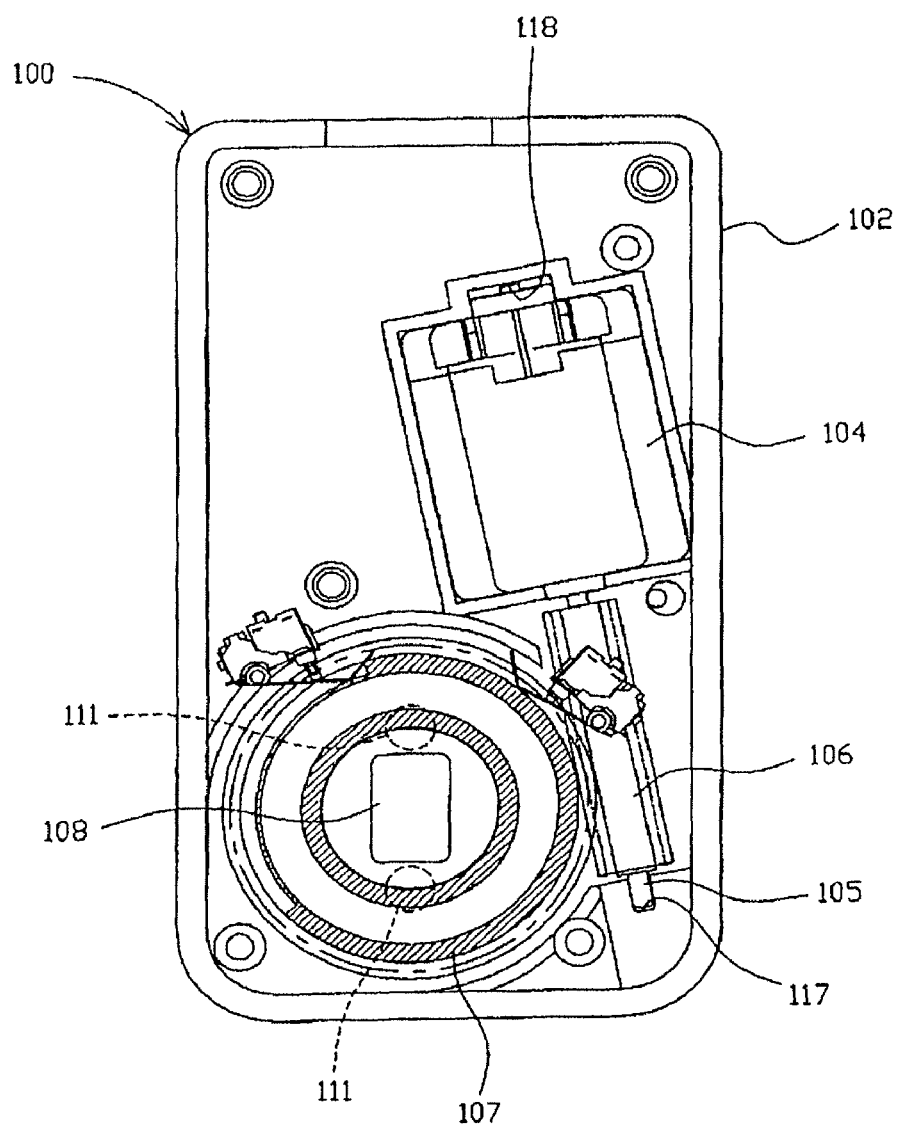
FIG. 10 is a transverse sectional view of a motor-driven steering lock device according to the prior art.
Figure 11:
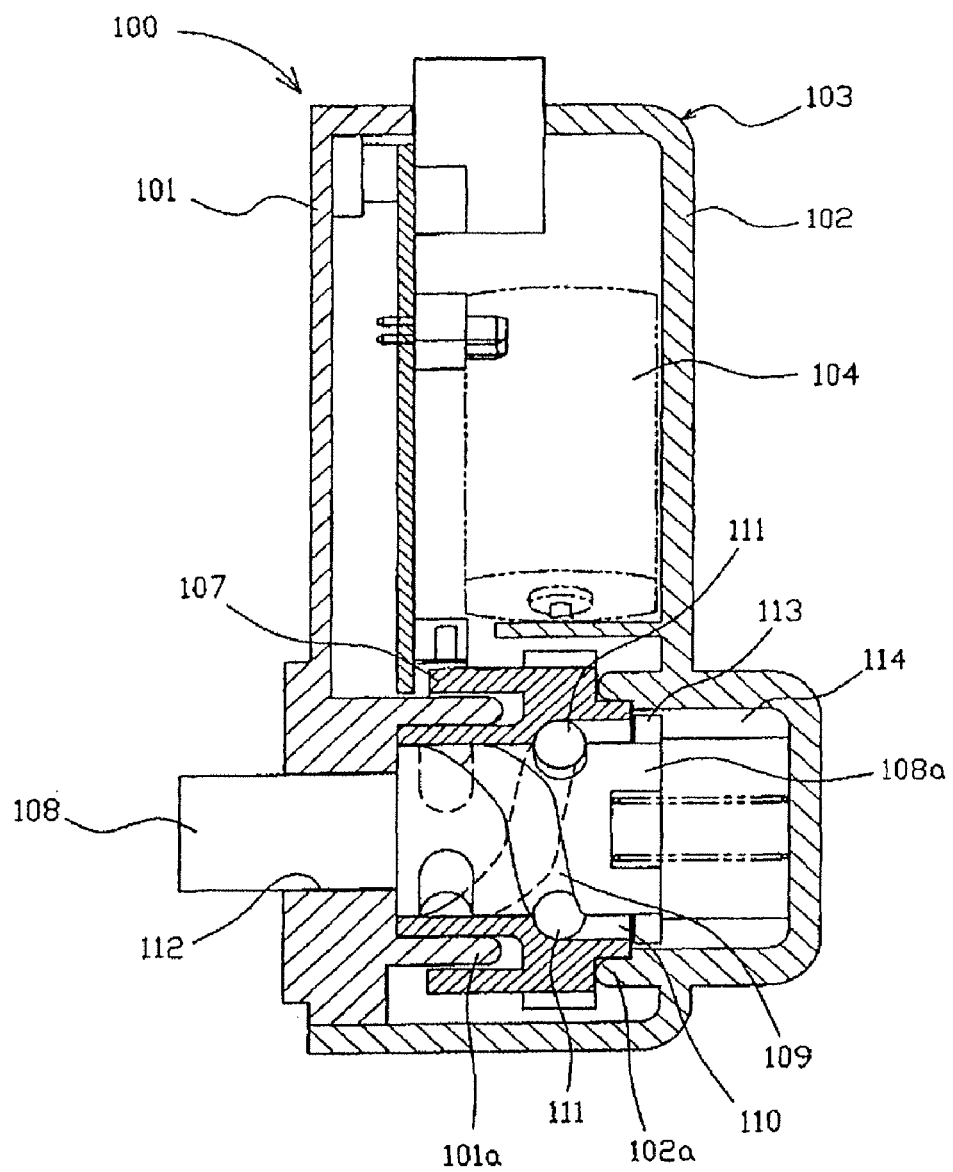
FIG. 11 is a longitudinal sectional view of a motor-driven steering lock device according to the prior art.
Figure 12:
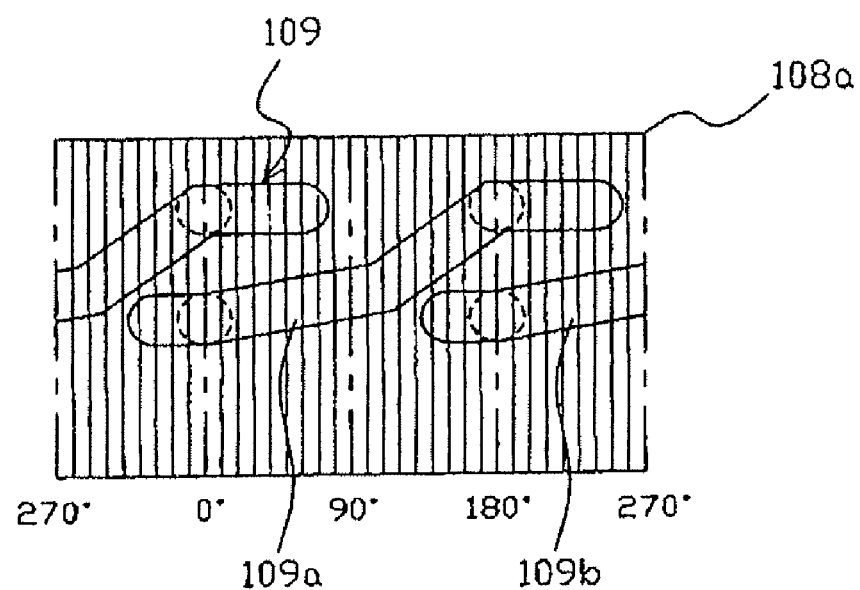
FIG. 12 is a development elevation of an outer circumference of a lock bolt of a motor-driven steering lock device according to the prior art.

At this time, the lock bolt 4 goes back to the unlocked position where the top end is pulled in the cover body 1 as shown in FIG. 9.

Thus, if the lock bolt 4 moves to the unlocked position from the locked position, the engagement of the top end of the lock bolt 4 with the engagement recess of the steering shaft is released, and the steering is in an unlocked conditions upon release of regulated rotation of the steering shaft.

On the other hand, the motor 6 is driven in reverse rotation in order to put the lock device in the locked condition.

Thereby, the worm 69 attached to the output shaft 68 rotates counterclockwise seen from the motor 6, and the rotation member 5 in which the worm wheel 62 engages with the worm 69 starts to rotate to the locked direction (in FIG. 5, counterclockwise direction).

At this time, reactive thrust force applied to the worm 69 from the worm wheel 62 acts to the direction of thrust pointing the output shaft 68 of the motor 6 to the first bearing member 71. As the top end of the output shaft 68 of the motor 6 abuts on the first bearing member 71 without any gap, the output shaft 68 does not rattle.

When the rotation member 5 starts to rotate in this way, the cam follower 67 residing in the unlocked area 54 in FIG. 8 moves sliding or rotating in the cam grooves 51, 52, and the lock bolt 4 starts to move upwards by rotation of the rotation member 5 and biasing force of the spring 44 for lock bolt.

When the rotation member 5 rotates at about 250 degree, it is detected by the micro switch (not shown) that the rotation member 5 rotates to the locked position. The reverse rotation of the motor 6 is stopped upon receipt of the switch signal while the cam follower 67 moves a little bit in the locked area 53 from the motor stopping position A of the cam grooves 51, 52 and then stops by inertia rotation of the motor 6 and the rotation member 5.

Thereby, the top end of the lock bolt 4 advances to and engages with the engagement recess of the steering shaft, and the rotation of the steering shaft is regulated and the steering is put in a locked condition.

As the grooves 51, 52 disposed on the lock bolt 4 are disposed inclining to the circumferential direction, turning force to rotate to the same direction with the rotation member 5 is applied to the lock bolt 4 when the cam follower 67 moves in the cam grooves 51, 52 by rotation of the rotation member 5.

This rotation of the lock bolt 4 is prevented by engagement of the engagement portion 50 of the lock bolt 4 with the rotation prevention hole 24, however, if there is a gap between the engagement portion 50 and the rotation prevention hole 24, the scope of rotation of the lock bolt 4 becomes larger, and hitting sound becomes louder when the engagement portion 50 hit the rotation prevention hole 24.

In contrast, in the lock device according to this embodiment, the rotation member 5 is coupled outwards with the rotation holding portion 23 disposed at the case body 1 and held as rotatably, and the lock bolt 4 is held by the circumferential face of the rotation member 5.

That is, the lock bolt 4 is in a condition that it is positioned indirectly by the case body 1 via the rotation member 5.

Accordingly, disposing of the rotation prevention hole 24 on the side of the case body 1 allows displacement of the lock bolt 4 to the rotation prevention hole 24 to be lesser.

By this, it is possible to set a gap smaller between the engagement portion 50 of the lock bolt 4 and the rotation prevention hole 24, and to minimize hitting sound of the engagement portion 50 of the lock bolt 4 with the rotation prevention hole 24.

Further, according to the lock device in this embodiment, a point of action to which force is applied from the cam follower 67 is displaced to the direction of the acting axis of the lock bolt 4 since two cam grooves 51, 52 are disposed displacing to the direction of the acting axis of the lock bolt 4.

Force to move the lock bolt 4 along the acting axis and force to push the lock bolt 4 inside to the radial direction are applied since the cross sectional shape of the cam grooves 51, 52 is semicircle.

By this, force acts the lock bolt 4 to incline the acting axis of the lock bolt 4. However, inclination of the lock bolt 4 can be prevented since the engagement portion 50 disposed on the lock bolt 4 is held by outer face to the radial direction of the rotation prevention hole 24 that is the lock bolt holding portion, and malfunction due to scratch, etc. of the lock member 41 with the lock bolt thrusting hole 22 arising from the inclination of the lock bolt 4 can be prevented.

Further, as to the gap between the engagement portion 50 and the circumferential radial side of the rotation prevention hole 24, displacement of the lock bolt 4 to the rotation prevention hole 24 can be smaller by disposing the rotation prevention hole 24 at the side of the case body 1 by the same reason mentioned above. As a result, the gap between the engagement portion 50 and the circumferential radial side of the rotation prevention hole 24 can be smaller. By this, inclination of the lock bolt 4 can be further prevented.

The steering lock device according to the present invention is not limited to the construction of the embodiment mentioned above but may be subject to various changes.

For example, in the embodiment mentioned above, the lock member 41 and cam member 42 are connected to form the lock bolt 4, while the lock member 41 and cam member 42 can be integrally formed.

In the embodiment mentioned above, the cam mechanism is constituted with the cam grooves 51, 52 disposed on the lock bolt 4, and the cam follower 67 disposed between the rotation member 5 and cam member 42. But it is not limited to such structure: for example, the cam mechanism can be constituted by that the cam grooves 51, 52 are disposed on an inner circumference of the rotation member 5 and the cam follower 67 is fixed on the side of the lock bolt 4.

Further, the cam follower 67 is not limited to steel balls in a spherical shape but pins or the like can be fixed on the rotation member 5 or lock bolt 4, for example.

In the embodiment mentioned above, the first cam groove 51 is constituted to be disposed displacing to the advancing direction of the lock bolt 4 against the second cam groove 52, higher than the height of the second cam groove 52, but not limited to it: the first cam groove 51 can be disposed displacing slightly to the advancing direction of the lock bolt 4 (lower than the height of the second cam groove 52).

Even if constituted thus, interference of the first cam groove 51 with the second cam groove 52 can be prevented since a prescribed space can be disposed between the first cam groove 51 and the second cam groove 52, and degree of freedom to set the inclining angle and length of each of the cam grooves 51, 52 can be enhanced.

In the embodiment mentioned above, the engagement portion 50 of the lock bolt 4 is projected and equipped in parallel with the advancing direction of the lock member 41 and the rotation prevention portion of the case body 1 is constituted as the rotation prevention hole 24 to receive said engagement portion 50 but without limitation to it: the engagement portion 50 can be a recess and the rotation prevention portion can be a convex projecting to the engagement portion 50, for example.

In the embodiment mentioned above, it is constituted by that biasing force of the spring 75 is applied to the first bearing member 71 to itself and the output shaft 68 of the motor 6 is abutted on the regulating face orthogonal with the output shaft 68, and the output shaft 68 is moved to push to the direction of thrust, but not without limitation to it: for example, the regulating face of the first bearing member 71 can be equipped inclining the output shaft 68 at a prescribed angle to a face orthogonal with the direction of thrust.

In the embodiment mentioned above, it is constituted by that the deformed portion 76 is equipped on the first bearing member 71 and the fixed portion 85 is equipped on the motor cover 7 as well, but not without limitation to it: for example, a rubber or double adhesive tape or the like is affixed on the motor cover 7 or the first bearing member 71 and thereby the first bearing member 71 is fixed by cohesion or adhesion of the members of the other part.

Further, the motor can be held undetachably to the case body by the case cover closing the opening of the case body and said fixed portion can be equipped on the case cover.

In the embodiment mentioned above show an example in which the motor-driven actuator according to the present invention is employed for a steering lock device for a vehicle, but without limitation to it, the structure of the present invention can be employed for a motor-driven actuator in every field.

What is claimed is:

1. A motor-driven actuator comprising:
   a motor with an output shaft, a worm attached to said output shaft, and a rotation member equipped with a worm wheel that mates with said worm inside a case;
   a first bearing member disposed opposingly to a direction of thrust of said output shaft projecting from said motor and equipped with a regulating face to which a front portion of a top end of said output shaft abuts, and shifted by biasing force of a spring so as to push said output shaft toward said motor;
   a second bearing member having an abutting face which abuts a rear end of said output shaft, temporarily housed in said case and a recess which abuts a rear end of said output shaft, housed at a temporary, first position;
   a motor cover to hold said motor at a prescribed position in said case, said motor cover having a fixed portion to prevent said first bearing member from being shifted, integrated into said case, and a bearing holding portion to push said second bearing member from the temporary, first housing position to a second housing position.

2. A motor-driven actuator according to claim 1, wherein said case has a housing portion to house said first bearing member in a manner wherein said first bearing member is movable, and a shaft holding portion, communicating with the interior of said housing portion, to hold a top end of the output shaft of said motor in a manner wherein said output shaft is rotatable, thereby setting said first bearing member by the biasing force of said spring to work in a direction crossing the thrust direction of the output shaft of said motor.

3. A motor-driven actuator according to claim 2, wherein said housing portion is recessed in a triangular shape having a first side established orthogonally to said shaft holding portion and a second side inclined at a prescribed angle relative to said first side, said first bearing member having a wedge shape cross section formed of the regulating face, which faces orthogonally with the direction of thrust of said output shaft and of a face inclined relative to said regulating face at the same angle as the opposing angle of the first side and the second side of the housing portion.

* * * * *